April 15, 1952  C. J. RYANT, JR  2,592,744
LIQUID LEVEL INDICATOR
Filed March 30, 1949  2 SHEETS—SHEET 1
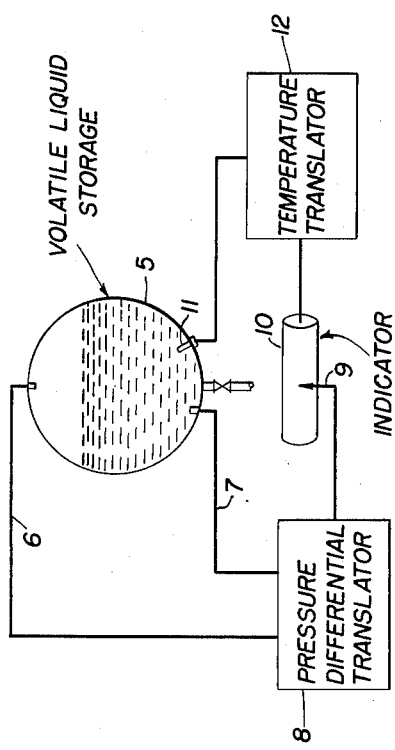
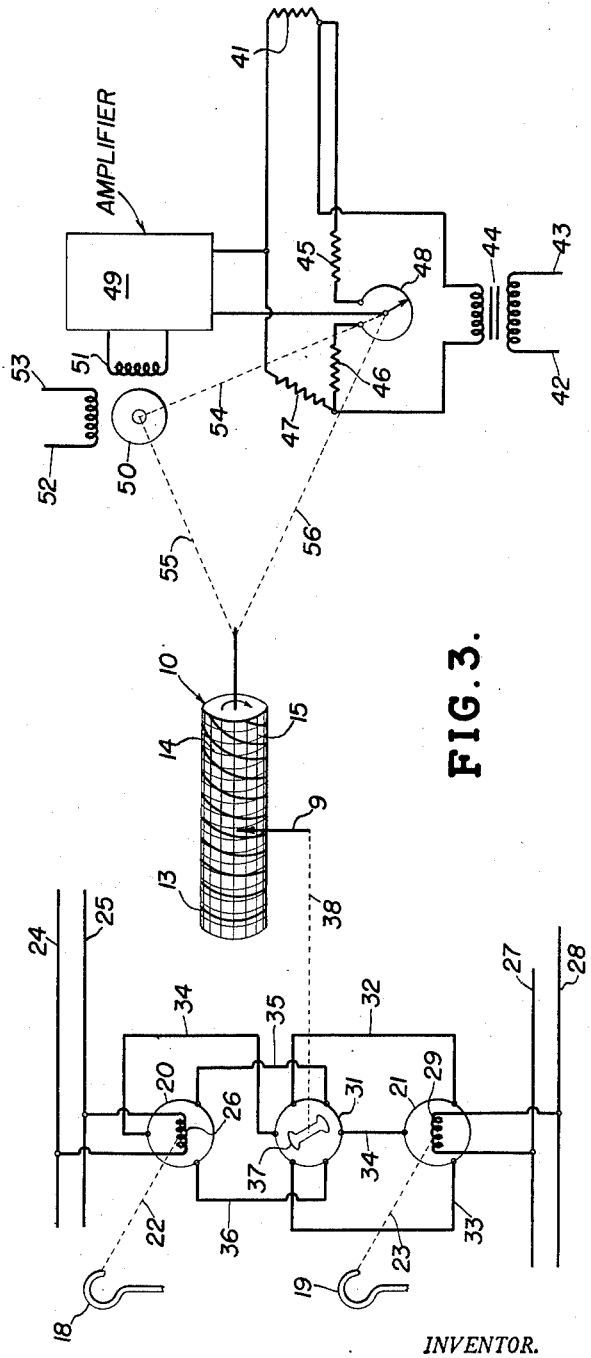
INVENTOR.
Charles J. Ryant, Jr.
BY Donald E. Payne
Theodore C. Virgil
ATTORNEYS Patented Apr. 15, 1952

2,592,744

UNITED STATES PATENT OFFICE 2,592,744

LIQUID LEVEL INDICATOR

Charles J. Ryant, Jr., Chicago, Ill., assignor to Standard Oil Company, Chicago, Ill., a corporation of Indiana Application March 30, 1949, Serial No. 84,316

1 Claim. (Cl. 73—301)

This invention relates to a device for indicating levels of liquids, and more particularly pertains to a device for continuously indicating levels of volatile liquids.

Heretofore the means for indicating levels of liquids in vessels situated remotely therefrom have been unsatisfactory. It has been observed that in order to obtain accurate liquid level indications it is necessary to provide a means which accurately compensates for variations in liquid level due to changes in the temperature of the liquid, as well as provide an accurate means for transmitting to the instrument the hydrostatic pressure exerted by the liquid. It is particularly important to compensate for variations in liquid level due to fluctuations of liquid temperatures when gaging volatile liquids, for the reason that usually appreciable variations in level are caused by liquid temperature changes.

An object of my invention is to provide an improved device for indicating levels of liquids. Another object of my invention is to provide a device for continuously indicating levels of liquids, particularly volatile liquids. Still another object of my invention is to provide a device for accurately and continuously indicating levels of liquids at a position remotely disposed with respect to the location of the liquid. A further object of my invention is to provide a device which accurately compensates for variations in liquid level due to fluctuations in the temperature of the liquid, particularly when gaging volatile liquids. Other objects and advantages of my invention will be apparent during the following description and explanation thereof.

I accomplish these and other objects of my invention by providing a rotatable element carrying a graduation of true liquid level lines which may be determined from componental isobar lines and componental isotherm lines of a particular liquid; or preferably said true liquid level lines are calibrated empirically for a particular liquid. Preferably said componental lines are in perpendicular relation to each other. A pressure differential or hydrostatic pressure translator means indicates the appropriate isobar line carried on said rotatable element; whereas a temperature translator means indicates the appropriate isotherm line on said rotatable element by an indicating movement, preferably, in a transverse plane with respect to the plane of indicating movement caused by the pressure differential translator means. To better appreciate the various applications and advantages to be derived from my invention, an example thereof will be given for the purpose of illustration.

In the accompanying drawings:

Figure 1 is a diagrammatical sketch showing the relative positions of the elements of the indicating device with respect to the liquid;

Figure 3 is a diagrammatical sketch showing an example construction of the indicating device.

Figure 2:
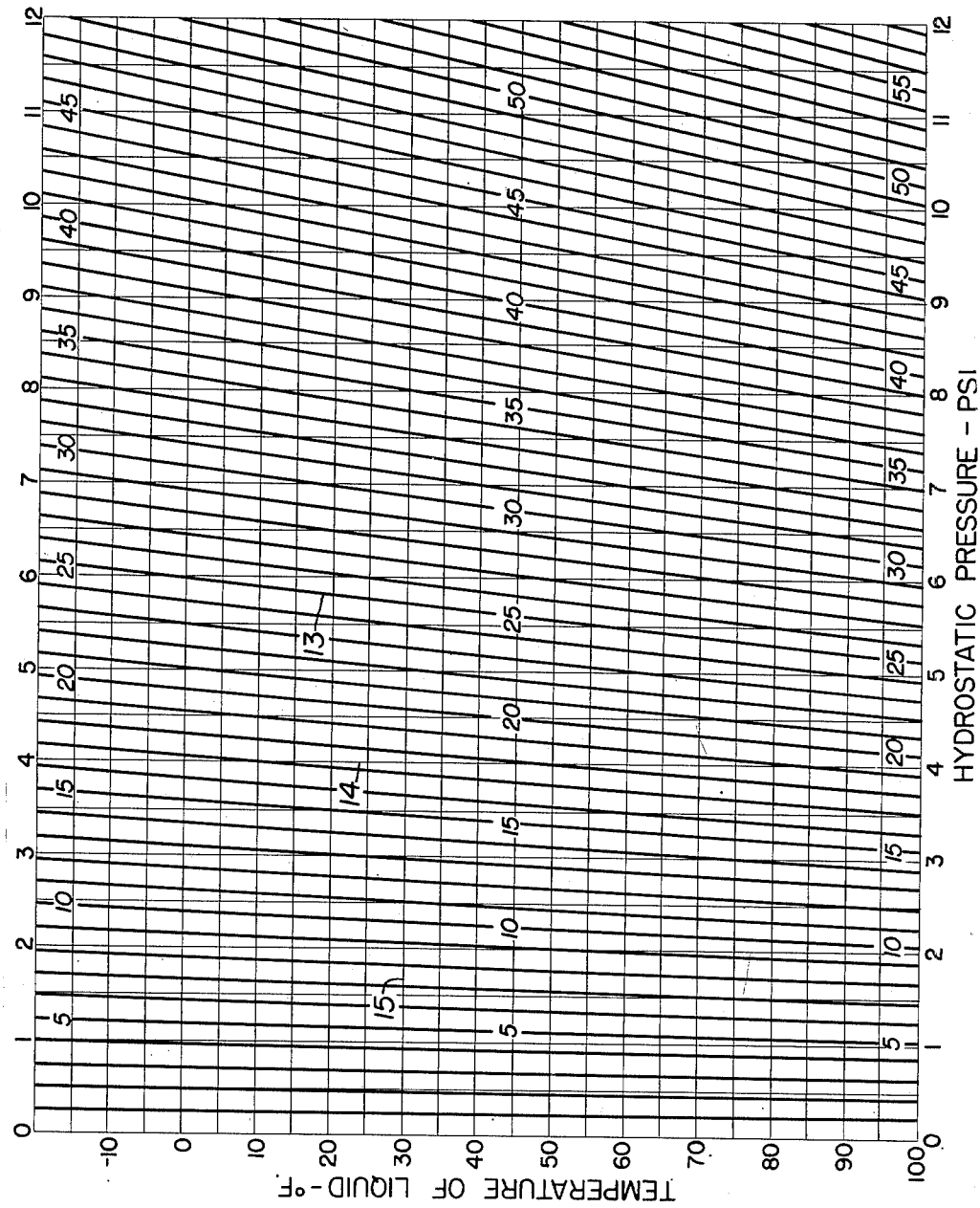
Figure 2 is a typical chart to be used for indicating liquid levels of propane.

In Figure 1, is shown a volatile liquid storage tank or vessel 5 having pressure tap lines 6 and 7 leading from the top and bottom thereof, respectively, to a pressure differential translator 8. The pressure differential is translated to an indicating pointer 9, which moves in an adjacent plane parallel to the longitudinal axis of rotatable element 10, thereby indicating the appropriate isobar line on said rotatable element 10. At the bottom portion of tank 5 is located a thermowell 11 containing a temperature measuring element, such as a temperature sensitive resistance bulb or a thermocouple or a thermometer (gas or liquid filled) which relays impulses to a temperature translator 12. The temperature impulses received by temperature translator 12 are transmitted as a rotational force to rotatable element 10, thereby adjusting the level indication with respect to indicating pointer 9 to give a true level reading.

Many variations in the arrangement of elements described hereinabove can be made within the scope of my invention. For instance, I may employ a device wherein the pressure differential translator 8 causes turning of rotatable element 10, and the temperature translator 12 causes the sliding movement of indicating pointer 9 in plane parallel and adjacent to the longitudinal axis of said rotatable element 10. I may also employ for my indicating device, an arrangement wherein the indicating pointer 9 is fixed at an appropriate position adjacent to the surface of element 10, and said element 10 being a translatable and rotatable element, so that either the pressure differential translator 8 or the temperature translator 12 will cause said element 10 to move in a plane parallel and adjacent to indicating element 9, and likewise either translator means 8 or 12 may cause said element 10 to rotate.

In Figure 2, is shown a typical chart for indicating levels of liquids for propane. In this chart the true liquid level lines, represented by oblique lines, such as line 13, are shown in relationship with the vertical isobar lines represented by line 14 and the horizontal isotherm lines represented by line 15. The graduations of true liquid level lines in this chart are calculated from the physical properties of propane by determining the actual or true level from the hydrostatic pressure and temperature. In this chart, the vertical axis of ordinate represents the temperature of the liquid in degrees Fahrenheit, and the horizontal axis or abscissa represents the hydrostatic pressure in pounds per square inch. For a given hydrostatic pressure and temperature of the liquid, the actual or true liquid level is calculated and represented as a point on the chart in units of feet of liquid level. After a sufficient number of points on the chart have been determined, the points being numerically equal are connected by lines, such as for example line 13. Although the chart shown in Figure 2 may be used for the purposes of our invention, it is preferred that the true liquid level lines be calibrated empirically so that the units in the above described chart will correspond to indicating movements effected by the temperature and pressure differential translators.

To illustrate my invention in more detail, in Figure 3, is shown rotatable element 10 carrying calibrations of true liquid level lines, represented by oblique lines, such as line 13, in relationship with the vertical isobar lines represented by line 14 and the horizontal isotherm lines represented by line 15. Preferably, the calibrations of true liquid level lines are on a separate chart means as shown in Figure 2, and is carried on the surface of rotatable element 10. The use of a separate chart means containing calibrations of true liquid level lines is more convenient for the reason that each kind of liquid stored requires a separate calibration of true liquid level lines, therefore in the event of a change in the kind of liquid stored, it is only necessary to change the chart to an appropriate one.

Also in Figure 3, 18 and 19 represent Bourdon tubes of the type employed in measuring pressure. Bourdon tubes 18 and 19 are directly connected to pressure tap lines 6 and 7, respectively (see Figure 1). These bourdon tubes 18 and 19 are mechanically linked to the shafts (not shown) of servomotors 20 and 21, respectively, and represented as dotted lines 22 and 23 so that any additional distortion in the shape of the Bourdon tubes caused by pressure change is transmitted as a torque to the shafts of servomotors 20 and 21. Lines 24 and 25 represent an outside source of electrical power for energizing servomotor 20 through 26, represented as a coil. Likewise, the outside source of power for servomotor 21 is represented by lines 27 and 28, and said motor is energized through 29, represented as a coil. Servomotors 20 and 21 are electrically connected to a differential servomotor 31, which connection is represented by lines 32, 33, 34, 35 and 36, so that the difference in pressures in Bourdon tubes 18 and 19, is resolved as a differential torque by the member 37 of differential servomotor 31. The differential torque exerted by differential servomotor 31 is translated as a linear movement to indicating pointer 9 by means of a mechanical linkage, represented by dotted line 38.

In the pressure differential translator just previously described, I may employ in place of Bourdon tubes 18 and 19 individual compressible bellows, or a differential bellows type of an arrangement, mechanically linked in such manner to the shafts (not shown) of servomotors so as to transmit a torqued force. Also, in place of the pressure differential translator described hereinabove, I may use Bristol's Metameter apparatus of the type described in U. S. Patents Numbers 1,338,715 and 1,478,861. With appropriate changes, such an apparatus is suitable for the purposes herein.

In Figure 3 is shown a continuous balance potentiometer pyrometer which has a temperature sensitive resistance bulb 41 located in thermowell 11 (shown in Figure 1) for detecting any changes in liquid temperature. Resistance bulb 41 is part of a Wheatstone bridge arrangement having an electromotive force impressed at 42 and 43, and said voltage supply being stepped down by means of bridge supply transformer 44 to the desired amount. Suitable electrical resistances, represented by 45, 46 and 47 are employed in the circuit in conjunction with slide wire 48, which serves to vary the voltage supplied by transformer 44. Any electrical changes effected by variations in liquid temperature is picked up by the electronic amplifier 49 and amplified sufficiently to operate a rebalancing motor 50 through the control winding 51 thereof. Lines 52 and 53 represent an outside source of power to rebalancing motor 50. In operation, a change in voltage caused by resistance bulb 41 is amplified by the electronic amplifier 49, which in turn supplies the energy necessary to operate rebalancing motor 50, and by a mechanical linkage, represented by dotted line 54, the slide wire 48 contact is repositioned to equalize the opposing voltages in the Wheatstone bridge arrangement. In my invention, the mechanical energy supplied by rebalancing motor 50 is also utilized in rotating the rotatable member 10 by mechanical linkages from either rebalancing motor 50 or from slide wire 48, as shown by dotted lines 55 and 56, respectively.

It is to be understood that the form of my invention, herewith shown and described, is to be taken as an illustration of the same, and that various changes in the shape, size and arrangement of parts may be resorted to, without departing from the spirit of my invention, or the scope of the subjoined claim.

Having thus described my invention, I claim:

An apparatus for indicating liquid level, which apparatus comprises a drum member mounted for rotation about its axis, a chart bearing a series of lines of increasing obliqueness and indicating volumes (which in turn determine liquid levels) at temperatures forming the chart ordinates and hydrostatic pressures forming the chart abscissas, said chart being carried on a drum with its ordinates around said drum and its abscissas along the side thereof parallel to its axis, an indicating pointer mounted for movement in a plane parallel to the longitudinal axis of the drum member and adjacent the surface thereof, a pressure differential translator consisting of a pair of expansible members movable in response to pressure for effecting hydrostatic pressure measurement, a pair of servomotors with the shaft of each motor mechanically linked to one of said expansible members, a differential servomotor electrically connected to said pair of servomotors and having a shaft mechanically linked to said pointer for causing movement thereof, and a temperature translator consisting of a continuous balance potentiometer pyrometer system having a rebalancing motor operatively connected to cause rotation of said drum member.

CHARLES J. RYANT, Jr.

REFERENCES CITED

The following references are of record in the file of this patent:

UNITED STATES PATENTS

| Number | Name | Date |
|---|---|---|
| 1,771,646 | Miguelon | July 29, 1930 |
| 2,151,579 | Bacon | Mar. 21, 1939 |
| 2,347,637 | Sprenkle | Apr. 25, 1944 |
| 2,382,695 | De Giers | Aug. 14, 1945 |
| 2,450,263 | Wise | Sept. 28, 1948 |

FOREIGN PATENTS

| Number | Country | Date |
|---|---|---|
| 754,601 | France | Aug. 28, 1933 |
| 829,790 | France | Apr. 19, 1938 |